US007577972B2

(12) United States Patent
Kimura et al.

(10) Patent No.: US 7,577,972 B2
(45) Date of Patent: Aug. 18, 2009

(54) EXTRACTING KEYWORDS FROM MULTILINGUAL ALPHABETIC AND GLYPH SCRIPTS IN AN ELECTRONIC PROGRAMMING GUIDE

(75) Inventors: Hitoshi Kimura, Kanagawa (JP); Kensuke Ohnuma, Tokyo (JP); Hidetoshi Ichioka, Tokyo (JP)

(73) Assignee: Sony Corporation (JP)

( * ) Notice: Subject to any disclaimer, the term of this patent is extended or adjusted under 35 U.S.C. 154(b) by 370 days.

(21) Appl. No.: 10/523,332

(22) PCT Filed: Jul. 30, 2003

(86) PCT No.: PCT/JP03/09678

§ 371 (c)(1),
(2), (4) Date: Jul. 27, 2005

(87) PCT Pub. No.: WO2004/012101

PCT Pub. Date: Feb. 5, 2004

(65) Prior Publication Data

US 2006/0116869 A1  Jun. 1, 2006

(30) Foreign Application Priority Data

Jul. 30, 2002 (JP) ............................. 2002-221698

(51) Int. Cl.
G06F 3/00 (2006.01)
G06F 13/00 (2006.01)
H04N 5/445 (2006.01)

(52) U.S. Cl. ................... 725/40; 725/39; 725/45

(58) Field of Classification Search .................... 704/8; 707/3, 4
See application file for complete search history.

(56) References Cited

U.S. PATENT DOCUMENTS 5,870,084 A * 2/1999 Kanungo et al. ............ 345/551

(Continued)

FOREIGN PATENT DOCUMENTS

EP          1 016 991 A2      7/2000

(Continued)

OTHER PUBLICATIONS

Yuichiro Aoki et al., "Information Retrieval System Data-710", NEC Technical Journal, Oct. 31, 1988, vol. 41, pp. 33 to 39.

(Continued)

*Primary Examiner*—David R Hudspeth
*Assistant Examiner*—Samuel G Neway
(74) *Attorney, Agent, or Firm*—Lerner, David, Littenberg, Krumholz & Mentlik, LLP

(57) ABSTRACT

An automatic keyword extraction apparatus includes a first extraction unit operable to extract a first keyword from title character string information of contents using a first keyword dictionary in which a character string designating a sub-genre is registered; and a second extraction unit operable to extract a second keyword from detailed character string information of the contents using a second keyword dictionary in which names of persons are registered, the extraction of the second keyword being performed utilizing a character type separation method. In this manner, it is possible for a user to extract a keyword for searching contents automatically, efficiently and accurately from the title character string information and detailed character string information of the contents such as EPG information even in home electric appliances in which the throughput capacity or the memory capacity of the CPU is not so large.

13 Claims, 6 Drawing Sheets

U.S. PATENT DOCUMENTS

| | | | |
|---|---|---|---|
| 6,415,099 B1 * | 7/2002 | Berger | 386/83 |
| 6,449,766 B1 * | 9/2002 | Fleming | 725/28 |
| 6,463,428 B1 * | 10/2002 | Lee et al. | 707/3 |
| 6,925,650 B1 * | 8/2005 | Arsenault et al. | 725/39 |
| 2002/0042923 A1 | 4/2002 | Asmussen et al. | |

FOREIGN PATENT DOCUMENTS

| | | |
|---|---|---|
| JP | 8-10452 B2 | 1/1996 |
| JP | 10 198667 A | 7/1998 |
| JP | 10-198667 A | 7/1998 |
| JP | 2000-115652 A | 4/2000 |
| JP | 2001-075959 | 3/2001 |

OTHER PUBLICATIONS

Ken'ichi Hinatsu, "JICST ni okeru Keyword Jido Chushutsu System no Shiyo", The Journal of Information Science and Technology Association, Nov. 1, 1992, vol. 42, No. 11, pp. 1051 to 1057.

Tobe M. et al. "An Intelligent Directory System With A Genre Inference Function", Global Telecommunications Conference, 1996. Globecom '96. Communications: The Key to Global Prosperity London, UK Nov. 18-22, 1996, New York, NY, USA, IEEE, US, vol. 1, Nov. 18, 1996, pp. 694-697, XP010220441, ISBN: 0-7803-3336-5.

Lee G. et al.: "Multi-level Post-Processing for Korean Character Recognition Using Morphological Analysis And Linguistic Evaluation", Pattern Recognition, Elsevier, Kidlington, GB, vol. 30, No. 8, Aug. 1997, pp. 1347-1360, XP004074595, ISSN: 0031-3203.

Kitai M. et al.: "ASR and TTS Telecommunications Applications In Japan", Speech Communication, Elsevier Science Publishers, Amsterdam, NL, vol. 23, No. 1-2, Oct. 1997, pp. 17-30, XP004117205, ISSN: 0167-6393.

* cited by examiner

FIG. 5

| |
|---|
| Extract title character string which is not separated by a special character as keyword as it is |
| Extract character strings of equal to or more than 2 letters as keywords within title character strings separated by special character respectively |
| "・" (Midpoint) is not treated as a special character<br>In a case when there exists "・" at the head or at the tail end of the extracted character string, a portion excluding "・" is made to be a keyword |

FIG. 6

| |
|---|
| Utilize Character Type Separation Method |
| Treat katakana and alphabet as same character types |
| Treat "・" as katakana and alphabet in a case when letter just before it are katakana and alphabet respectively |
| Extract character strings excluding only hiragana, only chinese character equal to or less than 2 letters and only chinese character equal to or more than 6 letters as keywords within separated character strings |

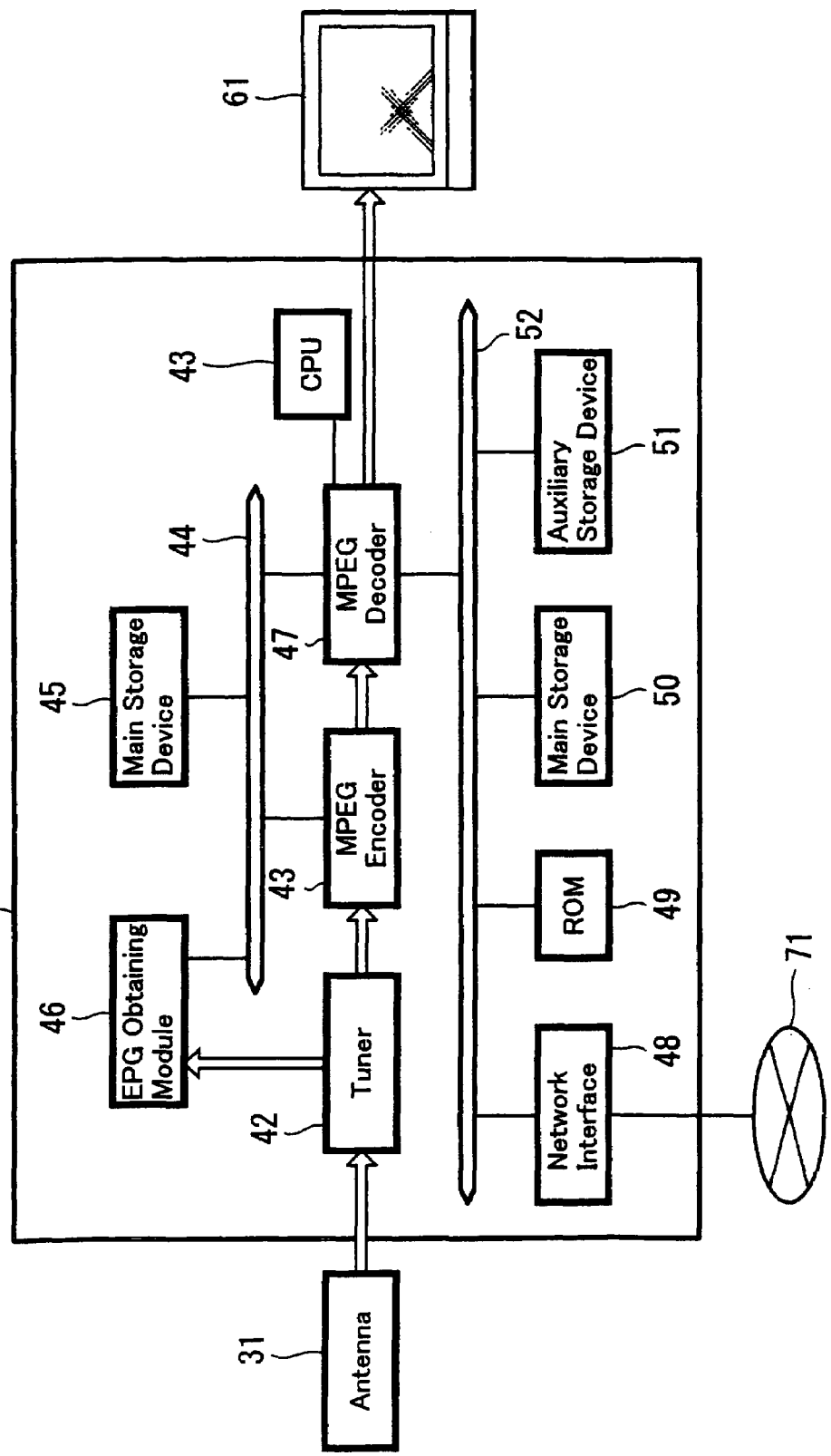

EXTRACTING KEYWORDS FROM MULTILINGUAL ALPHABETIC AND GLYPH SCRIPTS IN AN ELECTRONIC PROGRAMMING GUIDE

BACKGROUND OF THE INVENTION

The present invention relates to an apparatus, a method, a recording medium and a program which extract a keyword automatically from title character string information and detailed character string information of contents such as EPG (Electronic Program Guide) information.

In a digital television broadcast which has got into full swing in recent years, EPG information including information designating a program title (title character string information), information explaining details of the program (detailed character string information), information designating a genre of the program or the like is transmitted from the broadcast station together with video and audio data of the program. In a television receiver designed to have correspondence with the digital broadcast, it is possible to display an electronic program guide on a screen according to the EPG information.

Further, there is also an analog television broadcast in which such EPG information is transmitted.

In a case when a user searches for a program he wants to watch, he utilizes this electronic program guide so as to search from a title, to search by reading detailed character string information or the like after selecting a rough genre (for example, sport, drama or the like).

However, how to attach a title of a program has infinite variety, so that it is not always easy for a user to perform a search from a title. Also, detailed character string information of a program is described in the form of a sentence and it is not rare that a number of pages are covered for this, so that it is troublesome for a user to search from the detailed character string information.

On the other hand, it is very easy for a user to search if a program search is made possible, for example, by using a keyword of a name of a professional entertainer or the like. However, a keyword is not included independently in EPG information transmitted from the broadcast station at present. Therefore, it is necessary to extract a keyword from the EPG information in order to make the search using a keyword possible.

Heretofore, there existed a method as an extraction method of the keyword in which a user appoints head and tail end words of a character string which are desired to be determined as a keyword within a sentence of detailed character string information in an electronic program guide displayed on a television receiver by means of a cursor or the like.

However, according to this conventional extraction method, a user himself should perform an operation for appointing a keyword, so that it is complicated and at the same time, it is difficult to extract a large number of keywords in a short period of time.

On the other hand, a method called Japanese language morphological analysis is known as a general automatic keyword extraction method. However, according to this method, a program size and/or a dictionary size to be used become very large and at the same time, the CPU is to be subject to a large amount of load. Consequently, it is extremely inefficient to use this method in home electric appliances such as a television receiver in which the throughput capacity or the memory capacity of the CPU is not so large.

Further, a method called a character type separation method, is also known as a general automatic keyword extraction method. According to this method, a keyword is to be extracted by detecting differences of character types among Chinese characters, Katakana, Hiragana, letters, numerical characters and the like. However, it is not possible to perform an extraction of a keyword for searching a program accurately only according to this character type separation method. More specifically, with respect to a name of a professional entertainer which has a Chinese character for his family name and Hiragana or Katakana for his first name (for example, such a name as "akari ISHIDA"), it is not possible to extract the whole name, because the family name and the first name are to be separated. Further, it is not possible either to extract a foreigner's name whose first name is written in letters while the family name is written in Katakana or a foreigner's name in which "•" (midpoint) is inserted between his first and family names (for example, such a name as "B •Dooley"), because the family name and the first name are to be separated.

In view of the aforementioned aspect, the present invention was done according to a problem in which it becomes possible for a user to extract a keyword for searching the contents automatically, efficiently and moreover accurately from the title character string information and detailed character string information of contents such as EPG information even in home electric appliances in which the throughput capacity or the memory capacity of the CPU is not so large.

SUMMARY OF THE INVENTION

In order to solve this problem, the present applicant proposes an automatic keyword extraction apparatus which comprises a first extraction unit operable to extract a first keyword from title character string information of contents using a first keyword dictionary in which a character string designating a sub-genre is registered; and a second extraction unit operable to extract a keyword from detailed character string information of the contents using a second keyword dictionary in which names of persons are registered, and to extract a keyword utilizing a character type separation method.

In this automatic keyword extraction apparatus, the first keyword is extracted from the title character string information of contents (for example, title character string information in EPG information in case of a television broadcast) using a first keyword dictionary in which a character string designating a sub-genre is registered.

Also, a keyword is extracted from the detailed character string information of the contents (for example, detailed character string information in EPG information in case of a television broadcast) using the second keyword dictionary in which names of persons are registered and at the same time, a keyword extraction is also performed utilizing a character type separation method. In this regard, the name of a person which has Chinese characters for the family name and Hiragana or Katakana for the first name is also extracted as a keyword if it is the name of a person registered in the second keyword dictionary. Also even the name of a person which is not registered in the second keyword dictionary is extracted as a keyword by utilizing the character type separation method.

As described above, a keyword can be extracted accurately using a small sized program or dictionary by carrying out the keyword extraction from the title character string information and the keyword extraction from the detailed character string information with the help of keyword dictionaries different from each other and a rule (whether or not a character type separation method is utilized or the like) according to the respective information.

In this matter, it is possible for a user to extract a keyword for searching the contents automatically, efficiently and moreover accurately from the title character string information and detailed character string information of the contents, such as EPG information, even in home electric appliances in which the throughput capacity or the memory capacity of the CPU is not so large.

It should be noted in this automatic keyword extraction apparatus that it is preferable, as one example, for the first extraction unit to extract the first keyword from a portion within a title character string including a character string registered in the first keyword dictionary and excluding a character string registered in a predetermined character string dictionary for exclusion.

In this manner, it is possible for a user to extract a keyword for searching contents from the title character string information and detailed character string information of contents such as EPG information automatically, efficiently and moreover accurately even in home electric appliances in which the throughput capacity or the memory capacity of the CPU is not so large.

Further, the first extraction unit in this automatic keyword extraction apparatus, as one example, preferably extracts a character string separated by a special character other than at least one of Hiragana, Katakana, a Chinese character, a numerical character and an alphabet letter as the first keyword within a title character string which includes a character string registered in the first keyword dictionary.

In this manner, with respect to a title which is not separated by such a special character, the title itself is to be extracted as a keyword in a form as it is by avoiding a plurality of character strings included in the title from being extracted as a separated keyword.

The title which is not separated by such a special character is not useful so much as a keyword for searching contents, because the individual character string included in the title has an extremely broad meaning (because the search result has an extremely large amount of volumes) and it is often the case that the title itself becomes useful as a keyword for an efficient search of contents for the first time. Consequently, it becomes possible for a user to search contents still more effectively by using an extracted keyword (title itself).

Also, on the other hand, with respect to a title separated by a special character, an individual character string separated by a special character is to be extracted as each keyword.

With respect to a title separated by a special character (for example, a space, "x" or the like), each individual character string separated by a special character becomes useful as a keyword for searching contents and it is often the case that the title itself is too restricted to be useful as a keyword for searching contents (search result becomes zero or very few). Consequently, it also becomes possible for a user to search contents still more effectively by using an extracted keyword (individual character string separated by a special character).

Further, the second extraction unit in this automatic keyword extraction apparatus, as one example, preferably performs an extraction of a keyword utilizing the character type separation method from a portion excluding a character string registered in a predetermined character string dictionary for exclusion within a remaining portion of detailed character string information whose keyword has been extracted using the second keyword dictionary.

In this manner, it is possible to prevent a character string which is within character strings included in detailed character string information and is inappropriate for searching contents from being included in keywords. Consequently, it becomes possible for a user to search contents still more effectively by using extracted keywords.

Further, the second extraction unit in this automatic keyword extraction apparatus, as one example, preferably treats Katakana and an alphabet letter as the same character type while utilizing the character type separation method and at the same time, treats "•" (midpoint) as Katakana when a letter just before is Katakana or as an alphabet letter when the letter just before is an alphabet letter.

In this manner, it becomes possible to extract a foreigner's name in which his first name is written in alphabet letters and his family name is written in Katakana or a foreigner's name in which "•" (midpoint) is inserted between his first name and family name as a keyword.

Further, it is preferable that this automatic keyword extraction apparatus include a downloading unit operable to download the second keyword dictionary via a network, wherein the second extraction unit uses the downloaded second keyword dictionary.

In this manner, it becomes possible to extract a keyword by using the newest dictionary (dictionary in which the name of a person who became famous just recently is also registered) as the second keyword dictionary.

Next, the present applicant proposes an automatic keyword extraction method including extracting a first keyword from title character string information of contents using a first keyword dictionary in which a character string designating a sub-genre is registered; and extracting a keyword from detailed character string information of the contents using a second keyword dictionary in which names of persons are registered, and extracting a keyword utilizing a character type separation method.

Also, a recording medium recorded with a program which can be read by a computer is proposed for performing an automatic keyword extraction process, wherein the process includes extracting a first keyword from title character string information of contents using a first keyword dictionary in which a character string designating a sub-genre is registered; and extracting a keyword from detailed character string information of the contents using a second keyword dictionary in which names of persons are registered and for performing an extraction of a keyword by utilizing a character type separation method.

Also, a system is proposed for performing an automatic keyword extraction process, the system including a processor operable to execute instructions; and instructions for performing the automatic keyword extraction process, the process including extracting a first keyword from title character string information of contents using a first keyword dictionary in which a character string designating a sub-genre is registered; and extracting a keyword from detailed character string information of the contents using a second keyword dictionary in which names of persons are registered and for performing an extraction of a keyword by utilizing character type separation method.

According to the automatic keyword extraction method, the recording medium or the program, it becomes possible for a user to extract a keyword for searching contents automatically, efficiently and moreover accurately from title character string information and detailed character string information of contents such as EPG information even in home electric appliances in which the throughput capacity or the memory capacity of the CPU is not so large as similarly explained for the automatic keyword extraction apparatus relating to the present invention.

BRIEF DESCRIPTION OF DRAWINGS

FIG. 5 is a diagram showing a rule for extracting a keyword in the process of FIG. 3;

FIG. 6 is a diagram showing a rule for extracting a keyword in the process of FIG. 4; and FIG. 7 is a block diagram showing a hardware constitution of a program recording and reproducing apparatus for an analog television broadcast applied with the present invention.

DETAILED DESCRIPTION

Hereinafter, an example applied with the present invention in an apparatus which records and reproduces a program of a digital television broadcast will be explained by using drawings.

Figure 1:
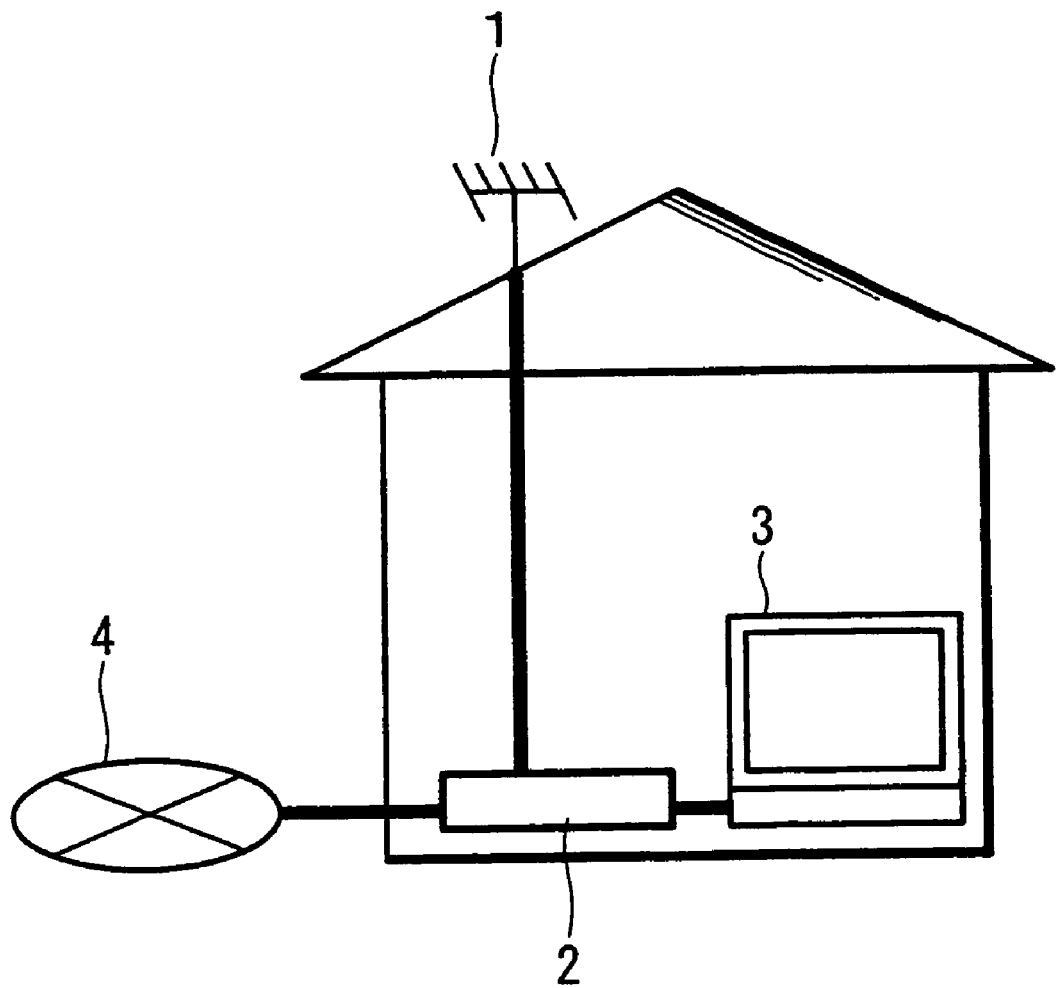
FIG. 1 is a diagram showing an outline of a digital television broadcast receiving system which includes a program recording and reproducing apparatus applied with the present invention.

FIG. 1 is a diagram showing an outline of a digital television broadcast receiving system which includes a program recording and reproducing apparatus applied with the present invention. A digital transmission signal transmitted from a television broadcast station is received by an antenna 1 and inputted to a program recording and reproducing apparatus 2. The program recording and reproducing apparatus 2 is connected to a display apparatus 3 which includes a display and a speaker and at the same time connected to an internet 4.

Figure 2:
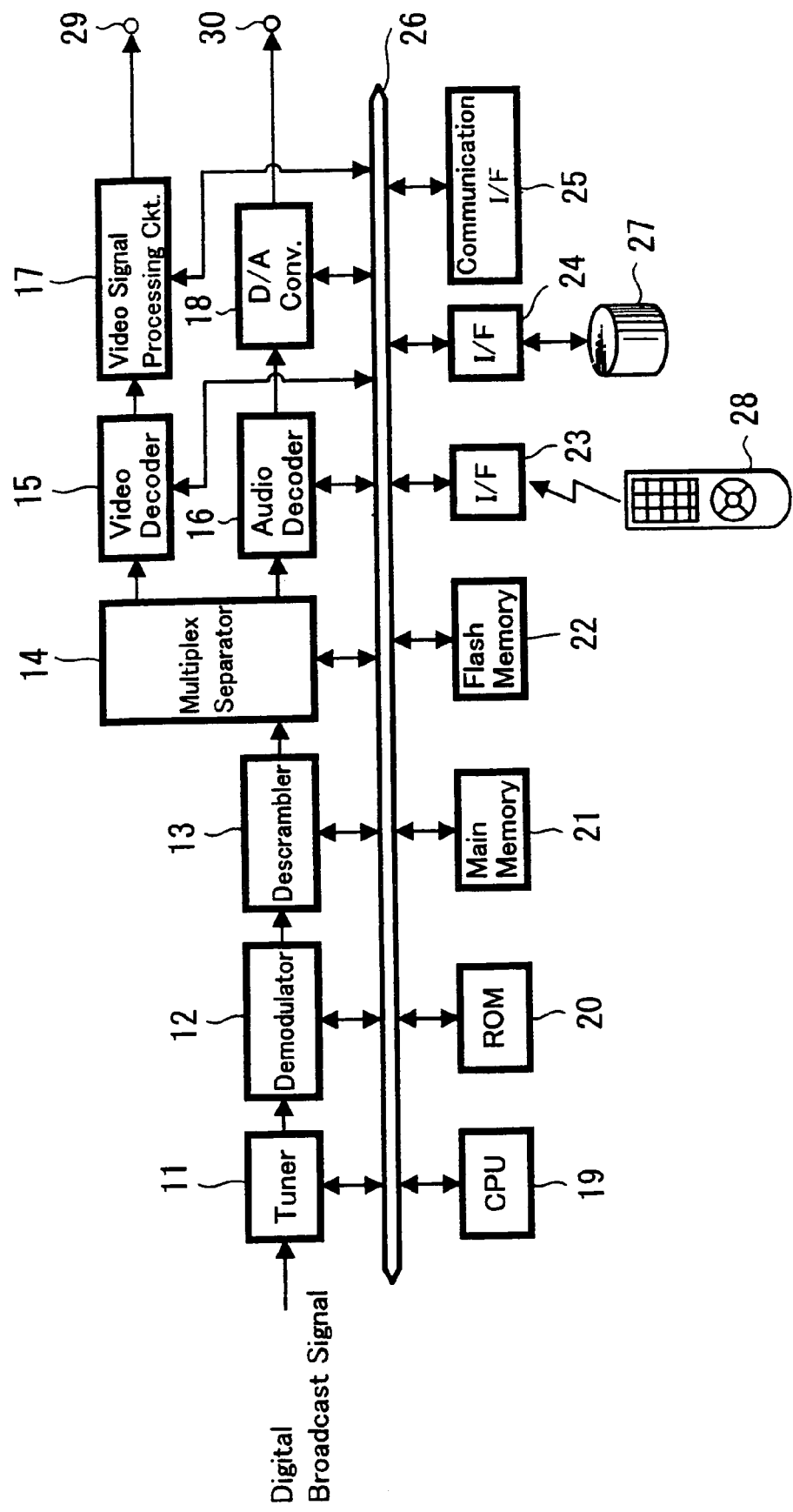
FIG. 2 is a block diagram showing a hardware constitution of the program recording and reproducing apparatus of FIG. 1.

FIG. 2 is a block diagram showing a hardware constitution of the program recording and reproducing apparatus 2. In the program recording and reproducing apparatus 2, a tuner 11, a demodulator 12, a descrambler 13 and a multiplex separator 14 are serially connected in this order and at the same time, with respect to the multiplex separator, a video decoder 15 and a video signal processing circuit 17 an din addition an audio decoder 16 and a D/A converter 18 are connected respectively in these orders.

Also, the tuner 11 to the D/A converter 18, a CPU 19, a ROM 20, a main memory (RAM) 21, a flash memory 22, an interface 23 for a remote controller, an interface 24 for an HDD (hard disk drive) and a communication interface 25 for an internet connection are connected to one another by means of a system bus 26. An HDD (hard disk drive) 27 for picture-recording a television program is connected to the interface 24.

In a remote controller (hereinafter referred to as REMOCON) 28 attached to the program recording and reproducing apparatus 2, various kinds of operation buttons (a power supply button, a channel selection button, a picture-record reservation button, a playback button, a direction key for performing a selection on an EPG on the screen, a determination key and the like), the same as those in a REMOCON attached to a television receiver for a normal digital broadcast, are provided.

When a television program is viewed and listened to, the digital transmission signal inputted to the program recording and reproducing apparatus 2 is selected in frequency band by the tuner 11 according to a channel selection operation of the REMOCON 28 and thereafter is demodulated in the demodulator 12 and descrambled in the descrambler 13, and thereafter is separated in the multiplex separator 14 into video and audio data packets of the program for multiple channels, into EPG information packets and the like.

The video and audio data packets for one channel extracted from the video and audio packets of the television program for multiple channels according to a channel selection operation of the REMOCON 28 are transmitted decoded to an MPEG-2Video and an MPEG-2Audio by the video decoder 15 and audio decoder 16, respectively. Also, the EPG information packets are transmitted to the CPU 19.

Then, the video signal decoded in the video decoder 15 and a video signal for the electronic program guide display produced in the CPU 19 by using the EPG information are applied with a conversion to the NTSC system in the video signal processing circuit 17, mixed or the like and outputted from a video output terminal 29 so as to be transmitted to the display apparatus 3 of FIG. 1.

Also, the audio signal decoded in the audio decoder 16 is analog-converted in the D/A converter 18 and outputted from an audio output terminal 30 so as to be transmitted to the display apparatus 3 of FIG. 1

The CPU 19 controls the whole program recording and reproducing apparatus 2 according to programs and data stored in the ROM 20 by using the main memory 21 as a working memory.

In the process performed by the CPU 19, there is an automatic keyword extraction process other than a process when viewing and listening to a television program according to a channel selection operation of the REMOCON 28 and a picture-recording process of the television program to the HDD 27 according to a picture-record reservation operation of the REMOCON 28.

In the ROM 20, a keyword dictionary for titles, an excluded character string dictionary for titles, a keyword dictionary for detailed information and an excluded character string dictionary for detailed information are stored as dictionaries to be used for the automatic keyword extraction process.

In the keyword dictionary for titles, there are registered character strings showing sub-genre (more detailed genre than a rough genre such as "sport" by the genre information in the EPG information) such as "professional baseball", "golf", "soccer", "hot spring", or "GO", "Japanese chess", "movie" or the like; character strings such as "passionate love" and "love"; and effective and moreover important character strings for searching for a program, within character strings which are often included in program titles such as character strings of baseball club names of the professional baseball.

In the excluded character string dictionary for titles, there are registered extremely general character strings as keywords for searching programs within character strings included in program titles such a "movie", "BS", and symbols unique in the program table (for example, a symbol of N surrounded by a square frame for designating a news program).

In the keyword dictionary for detailed information, there are respectively registered character strings of names written in only Hiragana, in a combination of Hiragana and Chinese characters, in a combination of Hiragana and Katakana, in a combination of Chinese characters and Katakana, in only Chinese characters of equal to or less than 2 letters and in only Chinese characters of equal to or more than 6 letters within names of famous people (professional entertainers, athletes, politicians, cultural figures or the like) who often appear in television programs. Also, in the keyword dictionary for detailed information, there are registered character strings other than names of persons which are proper character strings as keywords for searching for programs within character strings which are often included in detailed character string information in EPG information such as, for example, "hot spring".

In the excluded character string dictionary for detailed information, there are registered character strings inappropriate as keywords for searching for programs within character strings which are often included in detailed character string information in EPG information such as "guest", "ended" and "manager".

It should be noted relating to a keyword dictionary of detailed information that CPU 19 downloads the newest one (one registered with names of persons who became famous just recently or the like) from an exclusive site via the internet and stores it also in the flash memory 22.

Also, CPU 19 stores EPG information packets which are transmitted from the multiplex separator 14 on a channel selection operation of a user or on a picture recording according to a picture-record reservation operation of a user into the flash memory 22 on the assumption that an automatic keyword extraction process is to be carried out.

Figure 3:
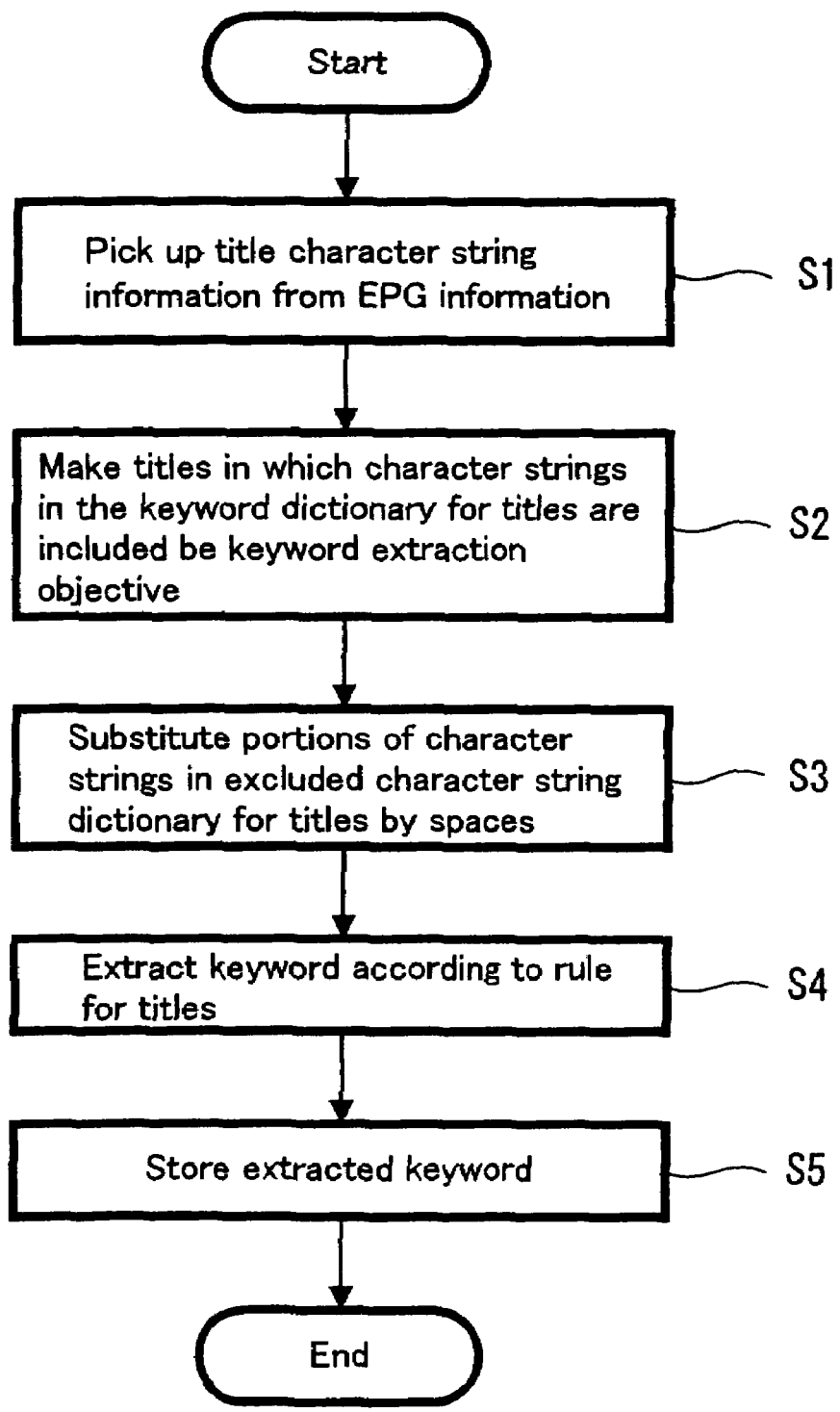
FIG. 3 is a flowchart showing an automatic keyword extraction process executed by a CPU in FIG. 2.
Figure 4:
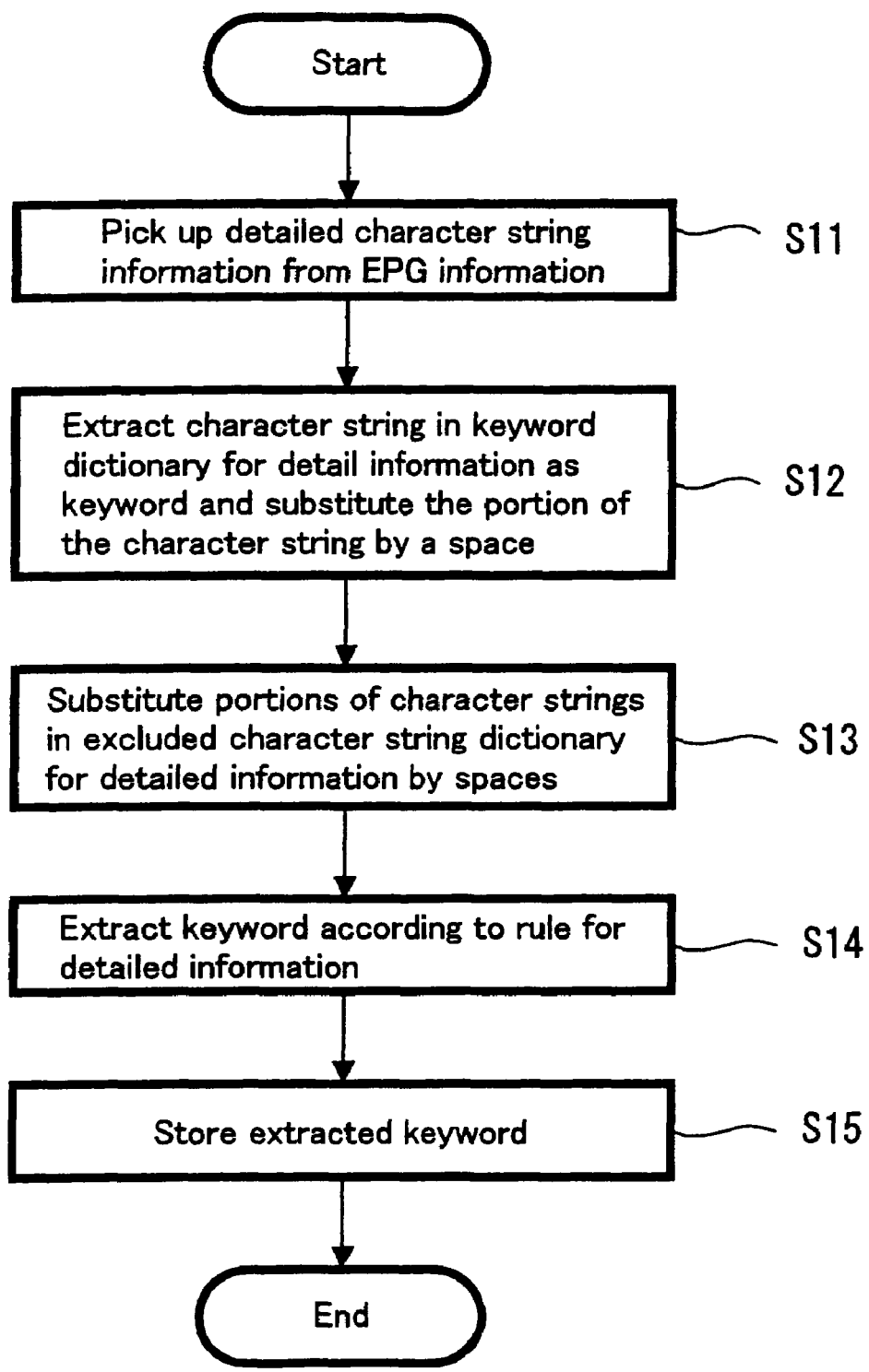
FIG. 4 is a flowchart showing an automatic keyword extraction process executed by a CPU in FIG. 2.

FIGS. 3 and 4 are flowcharts respectively showing automatic keyword extraction processes executed by the CPU 19. FIG. 3 therein shows a process for extracting a keyword from title character string information, wherein title character string information is first picked up from EPG information stored in the flash memory 22 (step S1).

Subsequently, character strings registered in a keyword dictionary for titles (character strings showing sub-genres such as "golf", "soccer", "hot spring", "GO", "Japanese chess", "movie" or the like) are searched from a plurality of program titles which the title character string information shows. Then, the whole title character strings in which character strings registered in the keyword dictionary for titles are included within these program titles are made to be a keyword extraction objective (step S2)

Subsequently, portions of character string ("movie", "BS" or the like) which are registered in an excluded character string dictionary for titles within titles which are made to be a keyword extraction objective in step S2 are substituted by spaces (step S3).

Subsequently, a keyword is extracted from the title character strings which went through a step according to an extraction rule for titles, such as shown in FIG. 5 (step S4).

According to the extraction rule for the titles, the title character string is extracted as a keyword as it is in a case when the title character string is not separated by a special character (space, X, [ ] or the like) other than characters of Hiragana, Katakana, Chinese characters, numerical characters and alphabet letters. On the other hand, in a case when the title character string is separated by such a special character, character strings keywords respectively within respective character strings separated by the special character.

However, "•" (midpoint) is not treated as a special character. Then, in a case when there exists a "•" (midpoint) at the head or at the tail end of the character string extracted as a keyword, a portion excluding the "•" (midpoint) is made to be a keyword.

Finally, the keywords extracted in step S4 are stored in the flash memory 22 as a keyword list of the title character string information (step S5).

Next, FIG. 4 is a process for extracting a keyword from detailed character string information. First, detailed character string information is picked up from EPG information stored in the flash memory 22 (step S11).

Subsequently, a character string (famous person's name or the like) registered in the keyword dictionary for detailed information is searched from that detailed character string information. Then, a character string registered I the keyword dictionary for the detailed information is extracted as a keyword within the detailed character string information and at the same time, the portion of the character string is substituted by a half size space (step S12).

Subsequently, the portions of character strings ("guest", "ended", "manager" or the like) which are registered in an excluded character string dictionary for detailed information and which are within the character strings of detailed character string information which went through step S12 are substituted by half size spaces (step S13).

Subsequently a keyword is extracted from the character strings of detailed character string information which went through step S13 according to an extraction rule of the detailed character string information, such as shown in FIG. 6 (step S14).

According to the extraction rule for the detailed character string information, a character type separation method which separates Hiragana, Katakana, Chinese characters, numerical characters, alphabet letters and other character-type letters to one another is basically utilized.

However, Katakana and alphabet letters are treated as the same character types (not separated). Also, "•" (midpoint) is treated as Katakana in a case when the letter just before it is Katakana and is treated as an alphabet letter in a case when the letter just before it is an alphabet letter (not separated).

Then, character strings excluding character strings composed of only Hiragana, character strings composed of only Chinese characters equal to or less than 2 letters and character strings of only Chinese characters equal to or more than 6 letters are extracted as keywords within the separated respective character strings, respectively. However, a portion excluding "•" (midpoint) is made as a keyword in a case when "•" (midpoint) exists at the head or at the tail end of a character string extracted as a keyword.

Finally, keywords extracted in step S12 and keywords extracted in step S14 are stored in the flash memory 22 as a list of keywords in the detailed character string information (step S15).

Next, an aspect where a keyword for a program search is extracted in the program recording and reproducing apparatus 2 sill be explained by citing an embodiment.

It is assumed that titles such as, for example, those shown below are included within the title character string information in the EPG information which is transmitted from the multiplex separator 14 in case of a channel selection operation of a user or in case of a picture recording according to a picture-record reservation operation of a user and stored in the flash memory 22 (here, □ □ and Δ Δ designate professional baseball team-names).

Much ado about nothing of love professional baseball relay broadcast □ □ X Δ Δ

BS movie [space.wars]

Then, since character strings called "love", "professional baseball" and "movie" are registered in the keyword dictionary for titles in the process of FIG. 3, the whole character strings of the titles become extraction objectives of keywords in step S2, respectively, with respect to these respective titles.

Then, with respect to the BS movie ┌space.wars┘ within these titles, the portion "BS" and the portion "movie" are substituted by spaces in step S3.

Also, with respect to the professional baseball relay broadcast □□ X Δ Δ within these titles, a space (particular symbol) exists between "professional baseball relay broadcast" and "□□" and X (particular symbol) also exists between "□□" and "Δ Δ", so that character strings "professional baseball relay broadcast", "□□", and "Δ Δ" are extracted as keywords in step S4, respectively.

Also, with respect to ┌space.wars┘ within these titles where the portions "BS" and "movie" are substituted by spaces, it is separated by ┌┘ (particular symbol) and "•" (midpoint) is not handled as a particular symbol either, so that "space.wars" which is-the title itself of the original movie is extracted as a keyword in step S4.

Also, "Much ado about nothing of love" within these titles is not separated by a particular symbol, so that "Much ado about nothing of love" which is the title itself is extracted as a keyword in step S4.

Consequently, the character strings shown below are stored in the flash memory 22 in step S5 as keywords for the program search (as mentioned above, □ □ and Δ Δ are professional baseball team-names).

Much ado about nothing of love
Professional baseball relay broadcast
□ □
Δ Δ
Space.wars In this manner, with respect to titles such as "Much ado about nothing of love" and "space.wars" which are not separated by special characters, the titles themselves are extracted according the process of FIG. 3 as keywords in a form as they are with a situation where a plurality of character strings included in the titles are not extracted as random keywords.

The title which is not separated by such a special character is not useful so much as a keyword for a program search, because an individual character string of "love", "space" or the like included in the title has an extremely broad meaning (search result becomes very many) and it is often the case that the title itself is useful for the first time as a keyword for an efficient program search. Consequently, it becomes possible for a user to search for a program efficiently by using the extracted keyword (title itself).

In addition, with respect to the title character string of a movie called "space.wars", a character string such as "BS" and "movie", which were added to the title for the title character string information and are too general for a program search, is not included in the keyword and at the same time, "┌┘" which surrounded the title for the title character string information is not included in the keyword either. Consequently, it becomes possible for a user to search for a program efficiently.

On the other hand, with respect to the titles such as "professional baseball relay broadcast □ □ X Δ Δ" which are separated by special characters (space, "x", etc.), "professional baseball relay broadcast", "□□" and "Δ Δ", which are individual character strings separated by special characters, are extracted as keywords respectively according to the process of FIG. 3.

With respect to the title which is separated by such special characters, individual character strings separated by the special characters are useful as keywords for the program search, respectively, and it is often the case that the title itself is not so useful as a keyword for the program search, because it is too restricted (search result becomes zero or very few, because the title changes to another when the adversary team (concrete name such as "□ □". and "Δ Δ") becomes different). Consequently, it also becomes possible for a user to search a program efficiently by using the extracted keyword (individual character strings separated by special characters).

On the other hand, according to the process of FIG. 4, names or the like of famous people (chairman of program "Much ado about nothing of love" and a guest thereof and an actor who takes part in the movie "space.wars") which are registered in the keyword dictionary for detailed information are extracted as keywords in step S12 from the detailed character string information of the programs having these titles in the EPG information stored in the flash memory 22.

In this regard, names of famous people who have Chinese characters for their family names and Hiragana or Katakana for their first names (for example, name of akari ISHIDA) are also registered in the keyword dictionary for the detailed information, so that the names of such famous people are also extracted as keywords.

Also, a name of a person who became famous just recently is also extracted as a keyword, because the newest keyword dictionary for the detailed information downloaded via the internet is also used.

Also, the portions of the names or the like of the famous people and the portions of character strings ("guest", "ended", "manager" or the like) which are registered in an excluded character string dictionary for detailed information, within the character strings of detailed character string information, are substituted by half size spaces in step S12 and S13.

Then, a keyword is extracted in step S14 from the character strings of detailed character string information whose spaces were substituted according to an extraction rule shown in FIG. 6 whose spaces were substituted according to an extraction rule shown in FIG. 6

In this regard, Katakana and alphabet letters are handled as the same character type and at the same time, "•" (midpoint) is handled as Katakana in a case when a letter just before it is Katakana and as an alphabet letter in a case when a letter just before it is an alphabet letter, so that a foreigner's name in which "•" (midpoint) is inserted between his first and family names (for example, "B.Dooley") also can be extracted as a keyword.

Also, a name of a person which is not yet registered in the newest keyword dictionary for the detailed information (for example, obscure professional entertainer who just debuted) can be extracted as a keyword unless it is a name composed of only Hiragana, a name composed of only Chinese characters equal to or less than 2 letters or a name composed of only Chinese characters equal to or more than 6 letters (more specifically, unless it is a name which is not much likely to be the name of a person).

Also, character strings such as "guest", "ended" and "manager" which are inappropriate character strings for the program search are never extracted as a keyword, because they received the space substitution.

In this manner, in step S15, a name of a famous person who has Chinese characters for his family name and Hiragana or Katakana for his first name, a name of a person who became famous just recently, a foreigner's name whose first name is written in alphabet letters and whose family name is written in Katakana and a foreigner's name in which "•" (midpoint) is inserted between his first and family names are also stored in the flash memory 22 as keywords for a user to search a program efficiently by using the extracted keyword.

It should be noted for a method where a user uses the keywords stored in the flash memory 22 by the processes of FIGS. 3 and 4 for the program search that a proper method can be applied such that the CPU 19 produces, for example, according to a predetermined operation of the REMOCON 28, a video signal of a picture screen for the program search (picture screen for displaying keywords in a list and also for a user to select desired keywords therein so as to instruct a search) and transmits it to the display apparatus 3 by way of the video signal processing circuit 17 and the video output terminal 29.

As mentioned above, it is constituted in the program recording and reproducing apparatus 2 such that a keyword can be extracted accurately using a small sized program or dictionary by carrying out the keyword extraction from the title character string information in the EPG information and the keyword extraction from the detailed character string information with the help of keyword dictionaries different . each other and a rule according to the respective information.

In this manner, it is constituted such that a user can extract a keyword for searching for a program from the title character string information and detailed character string information in the EPG information automatically, efficiently and moreover accurately even though the throughput capacity or the memory (ROM 20, flash memory 22 or the like) capacity of the CPU 19 is not so large.

It should be noted in the above examples that the present invention is applied to an apparatus which records and reproduces a program of a digital television broadcast. However, the present invention is not restricted by this and it is needless to say that the present invention can be also applied to a program recording and reproducing apparatus which records and reproduces a program of an analog television broadcast.

FIG. 7 is a block diagram showing a hardware constitution of a program recording and reproducing apparatus for an analog television broadcast applied with the present invention. A video and an audio signal in an analog transmission signal which are received by an antenna 31 and inputted to a program recording and reproducing apparatus 41 is selected by a tuner 42 for a frequency band and encoded by an MPEG encoder 43.

When viewing and listening to a television program, this encoded video and audio data are decoded by an MPEG decoder 47 and transmitted to a display apparatus 61 by way of a program recording and reproducing apparatus 41.

On the other hand, when recording the television program, the video and audio data encoded by the MPEG encoder 43 are transmitted to a main storage device 45 through a bus 44 so as to be recorded in the main storage device 45.

Then, when reproducing, video and audio data read out from the main storage device 45 are transmitted to the MPEG decoder 47 through the bus 44, decoded in the MPEG decoder 47 and transmitted to the display apparatus 61 by way of the program recording and reproducing apparatus 41.

Also, in an EPG obtaining module 46, EPG information is obtained from an analog transmission signal which is selected in a frequency band by the tuner 42. This EPG information is also transmitted to the main storage device 45 through the bus 44 and stored in the main storage device 45.

Also, a communication interface 48 for connecting to an internet 71, a ROM 49, a main storage device 50, and an auxiliary storage device 51 are connected to a bus 52, respectively.

Also in this program recording and reproducing apparatus 41, the keyword dictionary for titles, the excluded character string dictionary for titles and the keyword dictionary for detailed information and the excluded character string dictionary for detailed information as mentioned above are stored in the ROM 49 (relating to a keyword dictionary for detailed information, the newest one is downloaded from an exclusive site via the internet and stored also in the flash memory 51) and at the same time, a CPU 53 which controls the whole program recording and reproducing apparatus 41 performs the same automatic keyword extraction process as that in FIG. 3 and FIG. 4 by using these dictionaries and the EPG information in the man storage device 45, and the extracted keywords are stored in the auxiliary storage device 51.

It is constituted also in this program recording and reproducing apparatus 41 quite similarly as that explained with respect to the program recording and reproducing apparatus 2 of FIGS. 1 and 2 such that a keyword can be extracted accurately using a small sized program or dictionary by carrying out the keyword extraction from the title character string information in the EPG information and the keyword extraction from the detailed character string information with the help of keyword dictionaries different each other and a rule according to the respective information.

In this manner, it is constituted such that a user can extract a keyword for searching for a program from the title character string information and detailed character string information in the EPG information automatically, efficiently and moreover accurately even though the throughput capacity or the memory (ROM 49, flash memory 51 or the like) capacity of the CPU 53 is not so large.

Also, in the above examples, the present invention is applied to a program recording and reproducing apparatus which has a body separate from a display apparatus. However, the present invention is not restricted by this and can be applied also to a television receiver where a program recording and reproducing apparatus and a display apparatus are formed as one body configuration or a television receiver which does not have a function of recording and reproducing the program.

Also, in the above examples, the present invention is applied for searching for a keyword from the title character string information of the program and detailed character string information in the EPG information. However, the present invention is not restricted by this and can be applied for searching for a keyword from title character string information and detailed character string information of contents other than the television program (for example, contents delivered via the internet).

Also, it is needless to say that the present invention is not restricted by the above examples and other Also, it is needless to say that the present invention is not restricted by the above examples and other various kinds of constitutions can be taken without departing from the scope of the present invention.

As mentioned above, an effect is obtained according to the present invention such that it becomes possible for a user to extract a keyword for searching for the program automatically, efficiently and moreover accurately from the title character string information and detailed character string information of the program such as EPG information even in home electric appliances in which the throughput capacity or the memory capacity of the CPU is not so large.

The invention claimed is:

1. An automatic keyword extraction apparatus, comprising:
 a first extraction unit operable to extract a keyword from title character string information which designates a title of contents in electronic program guide (EPG) information using a first keyword dictionary in which a character string designating a sub-genre is registered; and
 a second extraction unit operable to extract a keyword from detailed character string information which explains details of the contents in the EPG information using a second keyword dictionary in which names of persons are registered, and to extract a keyword utilizing a character type separation method, said first extraction unit being operable to make a whole title character string or strings in which character strings registered in the keyword dictionary for titles are included within a respective program title or titles a keyword extraction objective or objectives, substitute by a space or spaces a portion or portions of a character string or strings which are designated in an exclude character string dictionary for titles within a title or titles which are made to be a keyword extraction objective, and extract a keyword therefrom in accordance with a predetermined rule, and said predetermined rule includes extracting an entire respective title string when the respective title string is not separated by a special character from among a number of predetermined special characters which does not include "•" (midpoint), extracting two or more letters of the respective title string when the respective title string is separated by the special character, and when the respective title string includes the "•" (midpoint) at a beginning or end thereof extracting the respective title string without the "•" (midpoint).

2. An automatic keyword extraction apparatus according to claim 1, wherein said first extraction unit extracts as the keyword a character string separated by the special character other than at least one of Hiragana, Katakana, a Chinese character, a numerical character and an alphabet letter from within a title character string which includes a character string registered in the first keyword dictionary.

3. An automatic keyword extraction apparatus according to claim 1, wherein said second extraction unit extracts a keyword from a portion excluding a character string registered in a predetermined character string dictionary for exclusion utilizing the character type separation method within a remaining portion of the detailed character string information from which a keyword has been extracted using the second keyword dictionary.

4. An automatic keyword extraction apparatus according to claim 1, wherein said second extraction unit treats Katakana and an alphabet letter as the same character type when the character type separation method is utilized and at the same time, treats "•" (midpoint) as Katakana when a letter just before is Katakana or as an alphabet letter when the letter just before is an alphabet letter.

5. An automatic keyword extraction apparatus according to claim 1, further comprising a downloading unit operable to download the second keyword dictionary via a network, wherein the second extraction unit uses the downloaded second keyword dictionary.

6. An automatic keyword extraction method, comprising:

extracting, using a processor, a keyword from title character string information which designates a title of contents in electronic program guide (EPG) information using a first keyword dictionary in which a character string designating a sub-genre is registered; and extracting a keyword from detailed character string information which explains details of the contents in the EPG information using a second keyword dictionary in which names of persons are registered, and extracting a keyword utilizing a character type separation method, said extracting a keyword from title character string information includes making a whole title character string or strings in which character strings registered in the keyword dictionary for titles are included within a respective program title or titles a keyword extraction objective or objectives, substituting by a space or spaces a portion or portions of a character string or strings which are designated in an exclude character string dictionary for titles within a title or titles which are made to be a keyword extraction objective, and extracting a keyword therefrom in accordance with a predetermined rule, and said predetermined rule includes extracting an entire respective title string when the respective title string is not separated by a special character from among a number of predetermined special characters which does not include "•" (midpoint), extracting two or more letters of the respective title string when the respective title string is separated by the special character, and when the respective title string includes the "•" (midpoint) at a beginning or end thereof extracting the respective title string without the "•" (midpoint).

7. An automatic keyword extraction method according to claim 6, wherein a character string separated by a special character other than at least one of Hiragana, Katakana, a Chinese character, a numerical character and an alphabet letter is extracted as the first keyword from within a title character string which includes a character string registered in the first keyword dictionary.

8. An automatic keyword extraction method according to claim 6, wherein a keyword is extracted from a portion excluding a character string registered in a predetermined character string dictionary for exclusion utilizing the character type separation method within a remaining portion of the detailed character string information from which the keyword has been extracted using the second keyword dictionary.

9. An automatic keyword extraction method according to claim 6, wherein in the extraction of the keyword, Katakana and an alphabet letter are treated as the same character type when the character type separation method is utilized and at the same time, "•" (midpoint) is treated as Katakana when a letter just before is Katakana and is treated as an alphabet letter when the letter just before is an alphabet letter.

10. An automatic keyword extraction method according to claim 6, further comprising downloading the second keyword dictionary via a network, wherein the downloaded second keyword dictionary is used in the step of extracting the keyword utilizing the character type separation method.

11. A recording medium recorded with a program which can be read by a computer to perform an automatic keyword extraction process, the process comprising:

extracting a keyword from title character string information which designates a title of contents in electronic program guide (EPG) information using a first keyword dictionary in which a character string designating a sub-genre is registered; and extracting a keyword from detailed character string information which explains details of the contents in the EPG information using a second keyword dictionary in which names of persons are registered, and extracting a keyword utilizing a character type separation method, said extracting a keyword from title character string information includes making a whole title character string or strings in which character strings registered in the keyword dictionary for titles are included within a respective program title or titles a keyword extraction objective or objectives, substituting by a space or spaces a portion or portions of a character string or strings which are designated in an exclude character string dictionary for titles within a title or titles which are made to be a keyword extraction objective, and extracting a keyword therefrom in accordance with a predetermined rule, and said predetermined rule includes extracting an entire respective title string when the respective title string is not separated by a special character from among a number of predetermined special characters which does not include "•" (midpoint), extracting two or more letters of the respective title string when the respective title string is separated by the special character, and when the respective title string includes the "•" (midpoint) at a beginning or end thereof extracting the respective title string without the "•" (midpoint).

12. A system for performing an automatic keyword extraction process, the system comprising:

a processor operable to execute instructions; and instructions for performing the automatic keyword extraction process, the process including:

extracting a keyword from title character string information which designates a title of contents in electronic program guide (EPG) information using a first keyword dictionary in which a character string designating a sub-genre is registered; and extracting a keyword from detailed character string information which explains details of the contents in the EPG information using a second keyword dictionary in which names of persons are registered, and extracting a keyword utilizing a character type separation method, said extracting a keyword from title character string information includes making a whole title character string or strings in which character strings registered in the keyword dictionary for titles are included within a respective program title or titles a keyword extraction objective or objectives, substituting by a space or spaces a portion or portions of a character string or strings which are designated in an exclude character string dictionary for titles within a title or titles which are made to be a keyword extraction objective, and extracting a keyword therefrom in accordance with a predetermined rule, and said predetermined rule includes extracting an entire respective title string when the respective title string is not separated by a special character from among a number of predetermined special characters which does not include "•" (midpoint), extracting two or more letters of the respective title string when the respective title string is separated by the special character, and when the respective title string includes the "•" (midpoint) at a beginning or end thereof extracting the respective title string without the "•" (midpoint).

13. An automatic keyword extraction apparatus, comprising:

a first extraction means for extracting a keyword from title character string information which designates a title of contents in electronic program guide (EPG) information using a first keyword dictionary in which a character string designating a sub-genre is registered; and a second extraction means for extracting a keyword from detailed character string information which explains details of the contents in the EPG information using a second keyword dictionary in which names of persons are registered, and for extracting a keyword utilizing a character type separation method, said first extraction means being operable to make a whole title character string or strings in which character strings registered in the keyword dictionary for titles are included within a respective program title or titles a keyword extraction objective or objectives, substitute by a space or spaces a portion or portions of a character string or strings which are designated in an exclude character string dictionary for titles within a title or titles which are made to be a keyword extraction objective, and extract a keyword therefrom in accordance with a predetermined rule, and said predetermined rule includes extracting an entire respective title string when the respective title string is not separated by a special character from among a number of predetermined special characters which does not include "•" (midpoint), extracting two or more letters of the respective title string when the respective title string is separated by the special character, and when the respective title string includes the "•" (midpoint) at a beginning or end thereof extracting the respective title string without the "•" (midpoint).

* * * * *